(12) United States Patent
Ninjouji (10) Patent No.: US 9,177,128 B2
(45) Date of Patent: Nov. 3, 2015

(54) AUTHENTICATION DEVICE, AND NON-TRANSITORY COMPUTER-READABLE DEVICE STORING AUTHENTICATION PROGRAM

(71) Applicant: DeNA Co., Ltd., Tokyo (JP)

(72) Inventor: Takashi Ninjouji, Tokyo (JP)

(73) Assignee: DENA CO., LTD., Tokyo (JP)

( * ) Notice: Subject to any disclaimer, the term of this patent is extended or adjusted under 35 U.S.C. 154(b) by 0 days.

(21) Appl. No.: 14/462,887

(22) Filed: Aug. 19, 2014

(65) Prior Publication Data

US 2015/0067806 A1 Mar. 5, 2015

(30) Foreign Application Priority Data

Aug. 27, 2013 (JP) ................................. 2013-175590

(51) Int. Cl.
  *G06F 21/00* (2013.01)
  *G06F 21/31* (2013.01)

(52) U.S. Cl.
  CPC ...................... *G06F 21/31* (2013.01)

(58) Field of Classification Search
  USPC .......................................................... 726/7
  See application file for complete search history.

(56) References Cited

U.S. PATENT DOCUMENTS

| | | | |
|---|---|---|---|
| 6,303,924 B1 * | 10/2001 | Adan et al. ..................... | 250/221 |
| 7,562,227 B1 * | 7/2009 | Cox et al. ...................... | 713/183 |
| 2003/0028784 A1 * | 2/2003 | Uchida ......................... | 713/186 |
| 2006/0161992 A1 * | 7/2006 | Kempf ............................ | 726/34 |
| 2009/0133120 A1 * | 5/2009 | Cannizzaro et al. ............ | 726/18 |
| 2010/0073126 A1 * | 3/2010 | Morin et al. .................... | 340/5.2 |
| 2014/0123249 A1 * | 5/2014 | Davis et al. ....................... | 726/5 |

FOREIGN PATENT DOCUMENTS

| JP | 2000-339084 A | 12/2000 |
|---|---|---|
| JP | 2003-091506 A | 3/2003 |
| JP | 2008-176756 A | 7/2008 |

OTHER PUBLICATIONS

Ballagas, Rafael, et al. "The smart phone: a ubiquitous input device." Pervasive Computing, IEEE 5.1 (2006): 70-77.*

\* cited by examiner

*Primary Examiner* — Harris C Wang (57) ABSTRACT

There is provided an authentication device configured to: store, as an authentication information database, authentication information in which a preset authentication identifier including a plurality of identifiers is associated with a pattern of a relative input position of the plurality of identifiers; acquire as input information a piece of information indicating the identifier input from a user and the input position of the identifier; and grant authentication when the identifier included in the input information corresponds with the identifier in the authentication information and when a pattern of a relative input position of the identifier included in the input information corresponds with the pattern of the relative input position of the identifier in the authentication information.

8 Claims, 6 Drawing Sheets

| USER | AUTHENTICATION IDENTIFIER | PATTERN OF RELATIVE INPUT POSITION | TARGET PROCESSING |
|---|---|---|---|
| X | 1234 | A1-B1-A2-B2 | BALANCE CHECK, ENTRY |
| | | B2-B3-C2-C3 | WITHDRAWAL, WIRE PAYMENT, TRANSFER |
| | | A2-B1-B2-C1 | CHANGE OF PERSONAL IDENTIFICATION NUMBER |
| Y | 5678 | B2-A2-A1-B1 | BALANCE CHECK, ENTRY |
| | 6789 | A3-A1-B3-B1 | ANOTHER PROCESSING |
| Z | 9012 | C2-A1-C2-B2 | ALL PROCESSINGS |
| ⋮ | ⋮ | ⋮ | ⋮ |

| USER | AUTHENTICATION IDENTIFIER | PATTERN OF RELATIVE INPUT POSITION |
|------|---------------------------|-------------------------------------|
| X | 1234 | A1-B1-A2-B2 |
| Y | 5678 | B2-A2-A1-B1 |
| Z | 9012 | C2-A1-C2-B2 |
| ⋮ | ⋮ | ⋮ |

| USER | AUTHENTICATION IDENTIFIER | PATTERN OF RELATIVE INPUT POSITION | TARGET PROCESSING |
|---|---|---|---|
| X | 1234 | A1-B1-A2-B2 | BALANCE CHECK, ENTRY |
| | | B2-B3-C2-C3 | WITHDRAWAL, WIRE PAYMENT, TRANSFER |
| | | A2-B1-B2-C1 | CHANGE OF PERSONAL IDENTIFICATION NUMBER |
| Y | 5678 | B2-A2-A1-B1 | BALANCE CHECK, ENTRY |
| | 6789 | A3-A1-B3-B1 | ANOTHER PROCESSING |
| Z | 9012 | C2-A1-C2-B2 | ALL PROCESSINGS |
| ⋮ | ⋮ | ⋮ | ⋮ |

FIG. 10

| USER | AUTHENTICATION IDENTIFIER | RELATIVE/ABSOLUTE | PATTERN OF RELATIVE INPUT POSITION |
|---|---|---|---|
| X | 1234 | RELATIVE | A1-B1-A2-B2 |
| Y | 5678 | ABSOLUTE | B2-A2-A1-B1 |
| Z | 9012 | ABSOLUTE | C2-A1-C2-B2 |
| ⋮ | ⋮ | ⋮ | ⋮ |

FIG. 11

| USER | AUTHENTICATION IDENTIFIER | PATTERN OF RELATIVE INPUT POSITION | RELATIVE/ABSOLUTE | TARGET PROCESSING |
|---|---|---|---|---|
| X | 1234 | A1-B1-A2-B2 | RELATIVE | BALANCE CHECK, ENTRY |
| | | B2-B3-C2-C3 | ABSOLUTE | WITHDRAWAL, WIRE PAYMENT, TRANSFER |
| | | A2-B1-B2-C1 | ABSOLUTE | CHANGE OF PERSONAL IDENTIFICATION NUMBER |
| Y | 5678 | B2-A2-A1-B1 | RELATIVE | BALANCE CHECK, ENTRY |
| | 6789 | A3-A1-B3-B1 | ABSOLUTE | ANOTHER PROCESSING |
| Z | 9012 | C2-A1-C2-B2 | RELATIVE | ALL PROCESSINGS |
| ⋮ | ⋮ | ⋮ | ⋮ | ⋮ |

AUTHENTICATION DEVICE, AND NON-TRANSITORY COMPUTER-READABLE DEVICE STORING AUTHENTICATION PROGRAM

BACKGROUND OF THE INVENTION

1. Field of the Invention

The present invention relates to an authentication device that performs authentication and an authentication program.

2. Description of Related Art

A variety of personal identification numbers are used in processing such as authentication of a user who uses an ATM or a mobile phone. A typical personal identification number is composed of a four to eight digit number including numbers from 0 to 9 that are combined according to the number of digits being set.

SUMMARY OF THE INVENTION

Where the combination of numbers is used as the personal identification number, a user often uses a combination of numbers familiar to him such as his/her birthday ("19700101" when the user is born on Jan. 1, 1970, for example) or physical characteristic ("01600050" when the user is 160 cm tall and weighs 50 kg, for example) as the personal identification number. Such personal identification number can be easily known by analogy and thus possibly cause a problem in terms of security.

In response to the problem, the user may take measures such as increasing the number of digits and/or using numbers unfamiliar to him, which, however, make it more difficult for the user to memorize.

The object of the present invention is to provide an authentication device which has improved usability while ensuring security, and to provide an authentication program.

According to one aspect of the present invention, there is provided an authentication device including: a storage unit configured to store authentication information in which a preset authentication identifier including a plurality of identifiers is associated with a pattern of a relative input position of the plurality of identifiers; an acquisition unit configured to acquire, as input information, a piece of information indicating an identifier input from a user and an input position of the identifier; and an authentication processing unit configured to grant authentication when the identifier included in the input information corresponds with the identifier in the authentication information and when a pattern of a relative input position of the identifier included in the input information corresponds with the pattern of the relative input position of the identifier in the authentication information.

According to another aspect of the present invention, there is provided a non-transitory computer-readable device storing an authentication program which causes a computer, including a storage unit configured to store authentication information in which a preset authentication identifier including a plurality of identifiers is associated with a pattern of a relative input position of the plurality of identifiers, to function as: an acquisition unit configured to acquire, as input information, a piece of information indicating an identifier input from a user and an input position of the identifier; and an authentication processing unit configured to grant authentication when the identifier included in the input information corresponds with the identifier in the authentication information and when a pattern of a relative input position of the identifier included in the input information corresponds with the pattern of the relative input position of the identifier in the authentication information.

Here, a combination of the authentication identifier and the pattern of the relative input position is further associated with processing to be authenticated in the authentication information, and the authentication processing unit is preferably configured to grant authentication to the processing to be authenticated that is associated with the combination of the identifier and the pattern when the identifier included in the input information corresponds with the identifier included in the authentication information and the pattern of the relative input position of the identifier included in the input information corresponds with the pattern in the authentication information.

An absolute input position of the identifier is further associated in the authentication information, and the authentication processing unit is preferably configured to grant authentication when an absolute input position of the identifier further included in the input information corresponds with the absolute input position of the identifier in the authentication information.

The processing to be authenticated is further associated with a combination of the authentication identifier, the pattern of the relative input position, and the absolute input position in the authentication information, and the authentication processing unit is preferably configured to grant authentication to the processing to be authenticated that is associated with the combination of the identifier included in the input information as well as the absolute input position and pattern of the relative input position of the identifier included in the input information.

Moreover, the authentication information is preferably set by a user but may also be set automatically.

Furthermore, the acquisition unit is preferably configured to arrange side by side a plurality of input frames to which the identifier input from the user is input, and to acquire as the input position a position of the input frame designated when the input of the identifier by the user is accepted.

It is further preferred that the identifier includes any or a combination of a number, an alphabetic character, a hiragana character, a katakana character, a kanji character, a color, a sound, an image, a motion, and a piece of measured information that can be processed to be identified.

According to the present invention, there can be provided the authentication device and the authentication program, the authentication device using the combination of identifiers in a small number of digits to have improved usability while ensuring security.

DETAILED DESCRIPTION OF THE INVENTION

Figure 1:
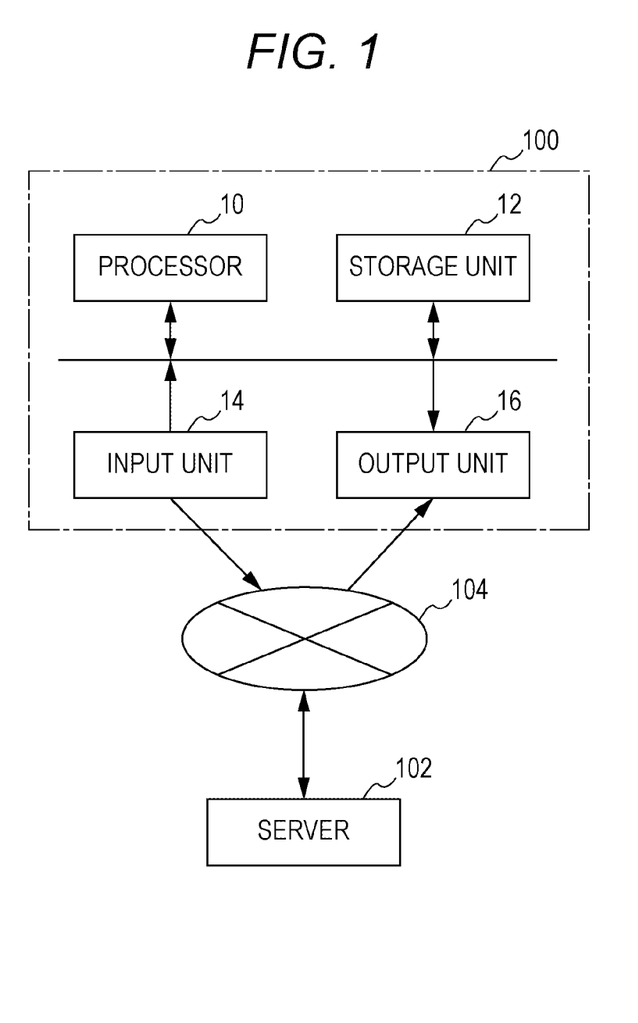
FIG. 1 is a diagram illustrating a configuration of an authentication device according to an embodiment of the present invention.

An authentication device 100 according to an embodiment of the present invention includes a processor 10, a storage unit 12, an input unit 14, and an output unit 16 as illustrated in FIG. 1. In other words, the authentication device 100 includes a basic configuration of a computer and can thus be provided in the form of a general PC, smartphone, tablet, mobile phone, or the like. A part of the function of the authentication device 100 may also be realized by an external server 102 which is connected via a communication unit 104 such as the Internet.

The processor 10 includes means such as a CPU to execute arithmetic processing. The processor 10 implements authentication processing of the present embodiment by running an authentication program stored in the storage unit 12. The storage unit 12 includes a storage unit such as a semiconductor memory and a hard disk. The storage unit 12 is connected to the processor 10 to be accessible therefrom, and stores the authentication program, authentication information provided to perform the authentication processing, and input information input from a user. The input unit 14 includes means to input information to the authentication device 100. The input unit 14 includes a touch panel and a keyboard accepting input from the user, for example. The output unit 16 includes means to output a user interface screen (UI) which receives the input information from the user as well as an authentication result generated in the authentication device 100. The output unit 16 includes a display that presents an image to the user, for example.

The authentication device 100 of the present embodiment performs the authentication processing by using the combination of an authentication identifier including a plurality of identifiers and a pattern of a relative input position of the plurality of identifiers. A personal identification number composed of a combination of numbers in four digits serves as the authentication identifier, for example.

The identifier is not limited to numbers but may be a piece of information that is mutually distinguishable. For example, the identifier may include a symbol such as an alphabetic character, a hiragana character, a katakana character, and a kanji character. The identifier may also be a piece of information that is mutually distinguishable such as a color, a sound, an image, and a motion. A combination of such identifiers is used as the authentication identifier in the present embodiment.

The number of identifiers is not limited as long as there are two or more. Security is enhanced by increasing the number of identifiers to serve as the authentication identifier, in which case, however, it is more difficult for the user to memorize the identifiers and is therefore preferred that the number of identifiers be set moderately.

Figure 2:
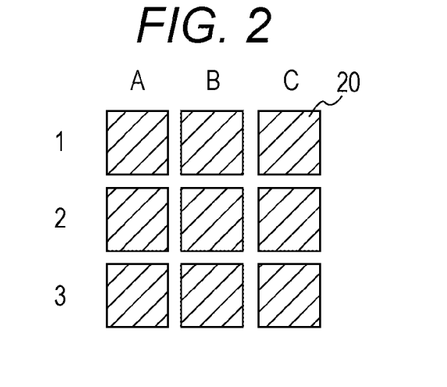
FIG. 2 is a diagram illustrating an example of the arrangement of an input frame according to an embodiment of the present invention.
Figure 3A:
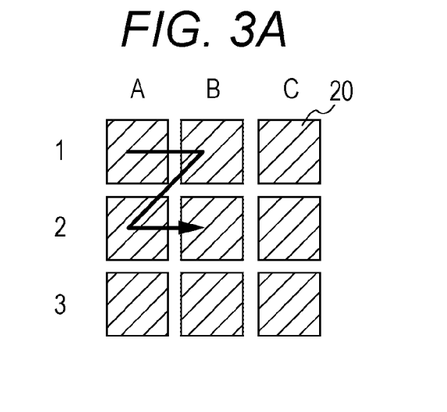
FIGS. 3A and 3B are diagrams each illustrating an example of a pattern of an input position of an identifier according to an embodiment of the present invention.
Figure 3B:
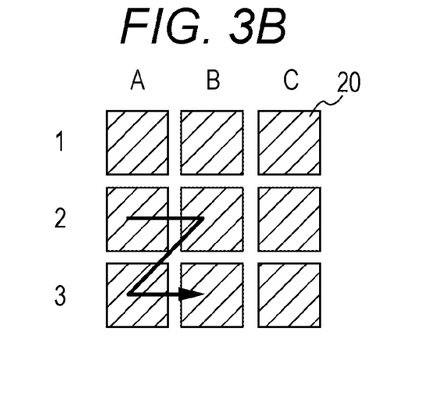

Moreover, the pattern of the relative input position means a combination of relative positions of a plurality of the authentication identifiers input through a user interface when the authentication identifier is input. Specifically, for example, the pattern of the relative input position means a pattern of the order in which an input frame 20 is selected when the user designates any of a plurality of the input frames 20 arranged side by side in a user interface screen displayed on the output unit 16, as illustrated in FIG. 2, and inputs the authentication identifier in order. FIG. 3A illustrates an example of the pattern of the relative input position of four authentication identifiers where each authentication identifier is input in the order that the input frame 20 is selected as indicated by an arrow (A1→B1 →A2 →B2). Note that an absolute input position is not taken into consideration in the present embodiment. Therefore, the pattern of the order of selection as indicated by the arrow in FIG. 3A (A1→B1→A2→B2) and a pattern of the order of selection as indicated by an arrow in FIG. 3B (A2→B2→A3→B3) are treated as the patterns of the same relative input position.

The number and arrangement of the input frame 20 are not limited to the present example, where the input frame may be provided such that two or more of the input positions can be selected. The security can be enhanced by increasing the number of input frames 20, which increases the number of combinations of the input positions but makes it difficult for the user to memorize the pattern. It is therefore preferred to set the number of input frames 20 to a moderate number.

Figure 4:
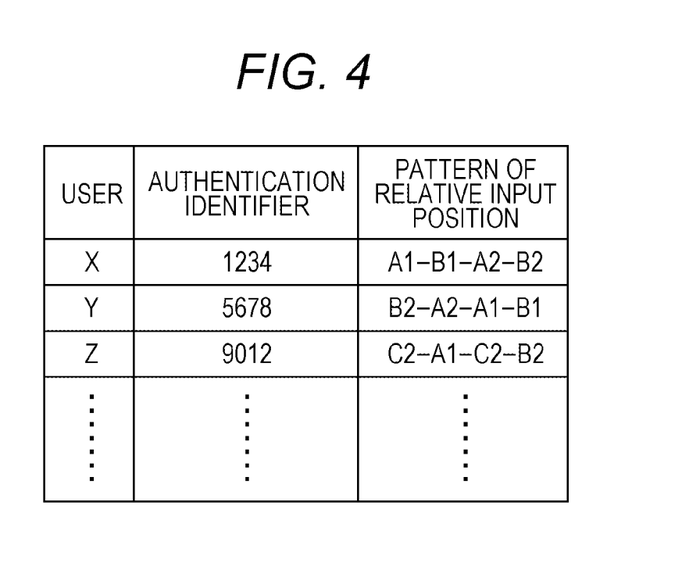
FIG. 4 is a diagram illustrating an example of an authentication information database registered according to an embodiment of the present invention.

Moreover, the pattern of the input position may be configured such that the same input frame 20 is selected a plurality of times. FIG. 4 illustrates an example where the input frame 20 corresponding to C2 is selected twice in a pattern C2→A1→C2→B2 registered in the authentication information of a user Z. The pattern may also be configured such that the same input frame 20 is selected successively.

Such authentication identifier combined with a pattern of a relative input position of the identifier is registered as a piece of authentication information into an authentication information database. The authentication information database is stored in the storage unit 12. As illustrated in FIG. 4, for example, a combination of numbers in four digits and a pattern of a relative input position of the combination are registered in the authentication information database.

The processor 10 runs an authentication program so that the aforementioned authentication information is used to perform the authentication processing in the authentication device 100. The authentication processing is performed according to a flowchart illustrated in FIG. 5. Accordingly, the authentication device 100 as illustrated in a functional block diagram in FIG. 6 can be realized.

Figure 5:
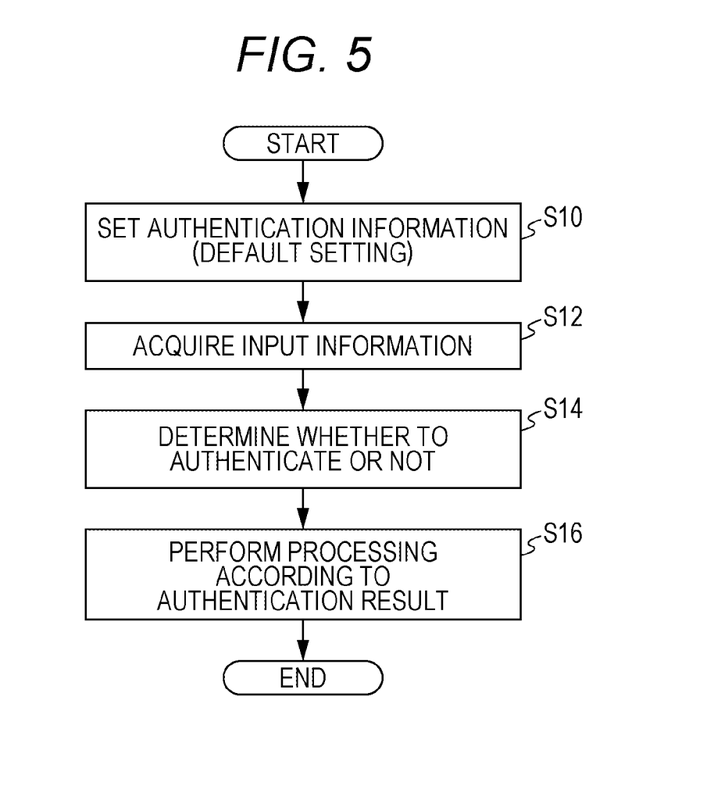
FIG. 5 is a flowchart illustrating authentication processing according to an embodiment of the present invention.
Figure 6:
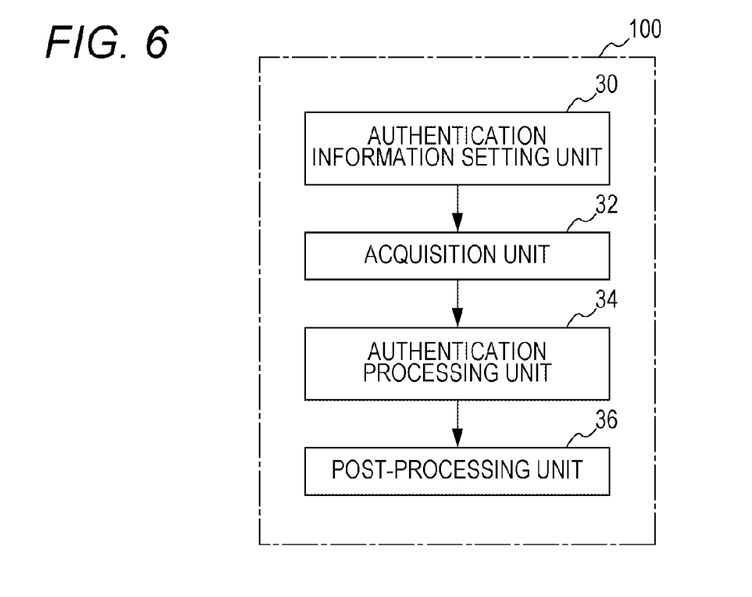
FIG. 6 is a functional block diagram of the authentication device according to an embodiment of the present invention.

The authentication information is set in step S10. The authentication information as described above is a piece of information in which the authentication identifier composed of the combination of the plurality of identifiers is associated with the pattern of the relative input position of the plurality of identifiers. The authentication information is set for each user who needs to be authenticated in the authentication processing. The processing here corresponds to an authentication information setting unit 30.

Note that the authentication information may be set by the user himself or may be set automatically in the authentication device 100 and presented to the user. When setting the information for himself, the user can input and register the authentication information to the authentication device 100 in advance. When the information is set automatically in the authentication device 100, the identifier and the input position thereof are selected at random so that the identifier and the order in which the input position is selected can be registered in advance as the authentication information of each user, for example. Here, an expiration date may be set to the authentication information in order to use the information for one-time authentication.

The authentication information is acquired from the user in step S12. The user uses the input unit 14 to input a piece of information specifying the user and the authentication information required to authenticate the user to the authentication device 100 through the user interface displayed on the output unit 16. The piece of information specifying the user may be a user name, a user ID, or the like. The processing here corresponds to an acquisition unit 32.

Figure 7:
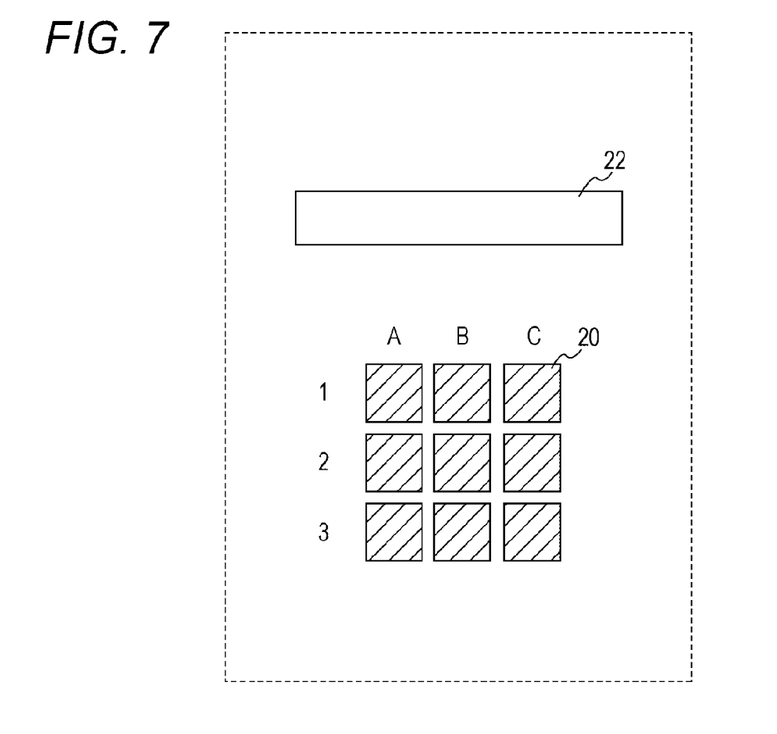
FIG. 7 is a diagram illustrating an example of an input screen according to an embodiment of the present invention.

As illustrated in FIG. 7, for example, a user interface screen is displayed on a touch panel, the user interface screen including an input frame 22 to which the user ID is input and the plurality of input frames 20 to which the authentication identifier is input. The user first inputs the user ID to the input frame 22. The authentication device 100 thus acquires the information specifying the user to be authenticated. The input user ID is stored in the storage unit 12. Next, the user designates the input frame 20 one by one to input the authentication identifier that gets himself authenticated. The authentication device 100 thus acquires the identifier and the input position thereof in order. The input identifier as well as the input position and input order thereof are stored in the storage unit 12.

For example, the user inputs "X" as the user ID, "1" as the identifier by selecting the input frame 20 corresponding to A1, followed by "2" to the input frame 20 corresponding to B1, "3" to the input frame 20 corresponding to A2, and "4" to the input frame 20 corresponding to B2.

Figure 8:
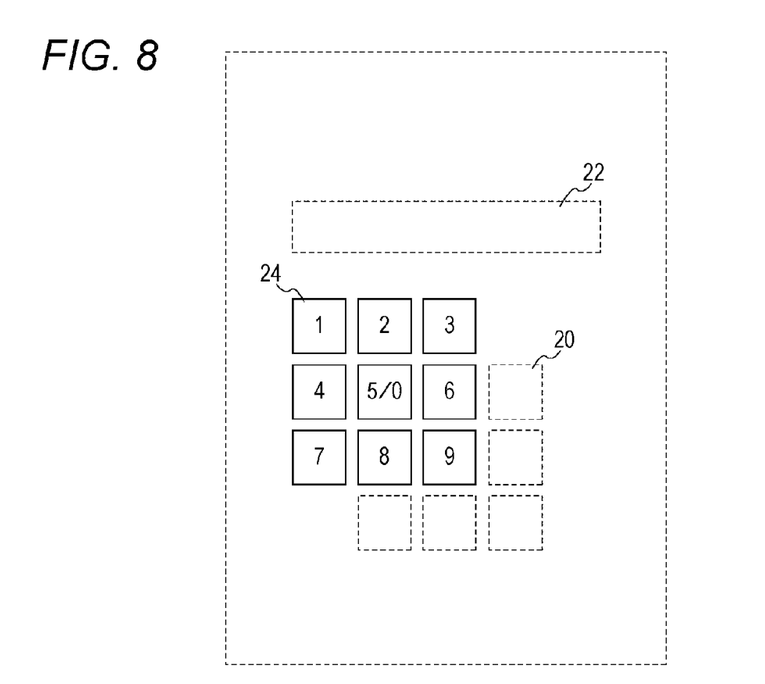
FIG. 8 is a diagram illustrating an example of a flick input screen according to an embodiment of the present invention.

There may be displayed an image, centered around the selected input frame 20, that is provided for the user to select the identifier when inputting the identifier to the input frame 20. There may be adopted a method in which, when the user taps the input frame 20 on the touch panel with his finger, a flick input screen 24 displaying choices is displayed around the tapped input frame 20 as illustrated in FIG. 8, for example, so that the user can slide his fingertip toward a choice to be input in order to input the choice as the identifier. FIG. 8 illustrates an example where the input frame 20 corresponding to A1 in FIG. 7 is selected. Note that while FIG. 8 illustrates the example where the numbers are displayed as the choices, there may also be provided a mode where a character type such as the alphabetic character, the hiragana character, the katakana character, or the kanji character is designated to be input.

In step S14, it is determined whether or not to grant authentication by comparing the input information with the authentication information. The processor 10 reads from the storage unit 12 the user ID and the input information acquired in step S12 and determines whether or not the input information corresponds with the authentication information registered for the user who is specified by the user ID in the authentication information database. In other words, it is determined whether or not the input identifier as well as the input position and input order thereof correspond with the authentication identifier and the pattern of the relative input position of the identifier that are registered as the authentication information. The processing performed here corresponds to an authentication processing unit 34.

The authentication is granted when the user ID is "X" and the identifiers "1234" are input to the input frame 20 in the order of A1→B1→A2→B2, for example, because the input information corresponds with the authentication identifier and the pattern of the relative input position of the identifier in the authentication information that is registered in association with the user X in the authentication information database illustrated in FIG. 4.

The authentication is also granted when the user ID is "X" and the identifiers "1234" are input to the input frame 20 in the order of A2→B2→A3→B3, B1→C1 →B2→C2, and B2→C2→B3→C3. This is because the input order of the identifiers as well as the pattern of the relative input position of these identifiers correspond with the input order in the authentication information and the pattern A1→B1→A2→B2, respectively. Accordingly, the authentication is granted in the present embodiment as long as the identifier input for authentication by the user as well as the input order and relative input position of the identifier correspond with those in the authentication information, regardless of the absolute position of the input position.

An authentication result is presented to the user in step S16. The processor 10 presents to the user that he is authenticated when the authentication is granted to the user in step S14, or executes processing that is permitted by the authentication. The processing permitted by the authentication includes a log-in to an application and withdrawal/deposit from/to a bank account, for example. The processing here corresponds to a post-processing unit 36.

The authentication device 100 performs the authentication processing as described above. According to the present embodiment, the combination of identifiers in the small number of digits is used to be able to perform the authentication with improved usability while ensuring security by using not only the combination of authentication identifiers but the pattern of the input position thereof in the authentication.

One can come up with about 10000 combinations when an arbitrary number between 0 and 9 is repeated in a four-digit number that is used as the personal identification number, for example. One can then come up with about 30 million combinations when four of nine input frames 20 in a 3×3 arrangement are selected with, say, no redundancy for the four-digit number and further combined with a pattern of a relative position thereof This exceeds the number of combinations created from a seven-digit character string in decimal notation. Alternatively, one can come up with 436.8 million combinations when four of 16 input frames 20 in a 4×4 arrangement are selected with no redundancy, which exceeds the number of combinations created from an eight-digit character string in the decimal notation. The number of combinations can be further increased by allowing for redundancy of the input frame 20 selected and increasing the number of input frames 20.

Note that when the authentication has failed, it may be adapted to accept input of the identifier once again without performing any processing. In this case, it may be adapted to establish a limit on the number of times the authentication processing can be performed and to discontinue the authentication processing or the service provided to the user once the authentication has failed for a predetermined number of times.

<First Variation>

Figure 9:
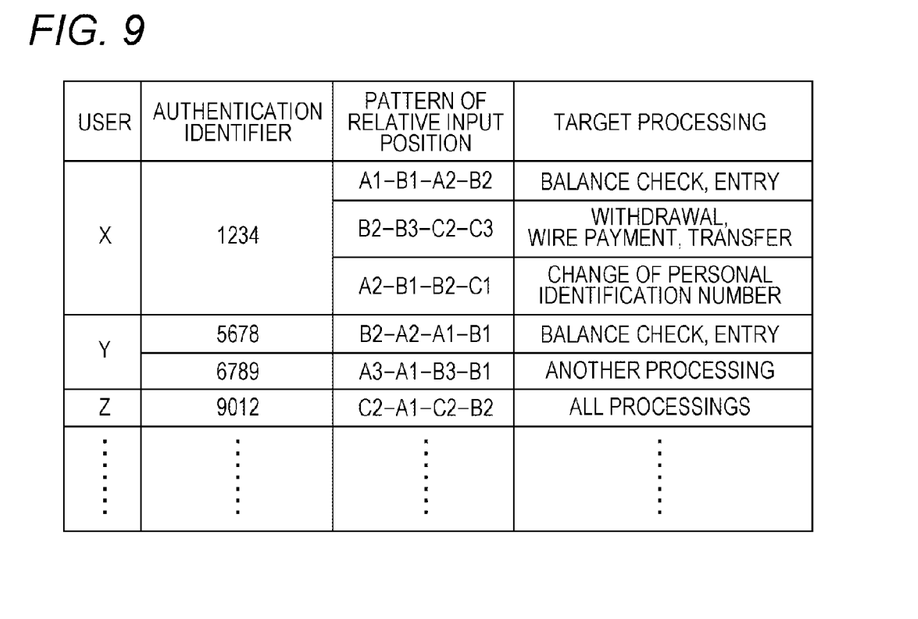
FIG. 9 is a diagram illustrating an example of an authentication information database registered according to first variation of the present invention.

It may also be adapted to change the processing to be authenticated in accordance with a combination of an authentication identifier and a pattern of a relative input position thereof One aspect is adapted to change the processing to be authenticated according to the difference in patterns of the relative input position of the authentication identifier that is provided in common In the example of an authentication information database registered in FIG. 9 where an authentication identifier "1234" is registered for a user X, a different pattern of the relative input position of the identifier corresponds to different processing to be authenticated including "balance check and entry", "withdrawal, wire payment, and transfer", and "change of a personal identification number" related to a bank account of the user X. In this example, the "balance check" and "entry" to the bank account of the user X are permitted when the authentication identifier "1234" is input to the input frame 20 with the pattern of the relative input position identical to A1 →B1→A2→B2. The "withdrawal", "wire payment", and "transfer" from/to the bank account of the user X are permitted when the authentication identifier "1234" is input to the input frame 20 with the pattern of the relative input position identical to B2 →B3→C2→C3. The "change of a personal identification number" for the bank account of the user X is permitted when the authentication identifier "1234" is input to the input frame 20 with the pattern of the relative input position identical to A2→B1 →B2→C1. Note that the combination of the authentication identifier and the pattern of the relative input position as well as the corresponding processing to be authenticated are not to be limited to these examples.

The security can therefore be enhanced by providing the different processing to be authenticated according to the pattern of the relative input position of the authentication identifier that corresponds to the personal identification number in the related art and is provided in common in the present example. The authentication processing corresponding to the content of the processing can be implemented by registering, as the authentication information, a simple pattern for processing that does not require high security and a complex pattern for processing that requires relatively high security, for example. Moreover, by registering a pattern that is not commonly used for the processing requiring relatively high security, the processing requiring high security can maintain the security even when a commonly-used pattern of the input position is found out by a third party in some way.

It can also be adapted to register in advance the processing in which, when the authentication identifier and the pattern of the input position are to be communicated to a third party in a certain circumstance, a notification is issued at the same time the authentication identifier and the pattern of the input position are used.

There is provided another aspect where the authentication identifier and the pattern of the relative input position thereof are both changed according to the processing to be authenticated. As illustrated in the example of the authentication information database registered in FIG. 9, different authentication identifier and pattern of the relative input position thereof provided for a user Y correspond to different processing to be authenticated including the "balance check and entry" and "another processing" pertaining to a bank account of the user Y. In this example, the "balance check" and "entry" to the bank account of the user Y are permitted when an authentication identifier "5678" is input to the input frame 20 with the pattern of the relative input position identical to B2→A2→A1→B1. The "another processing" for the bank account of the user Y is permitted when an authentication identifier "6789" is input to the input frame 20 with the pattern of the relative input position identical to A3→A1→B3→B1. Note that the combination of the authentication identifier and the pattern of the relative input position as well as the corresponding processing to be authenticated are not to be limited to these examples.

The security can therefore be enhanced by providing the different authentication identifier and pattern of the relative input position thereof according to the processing to be authenticated. The authentication processing corresponding to the content of the processing can be implemented by registering as the authentication information an authentication identifier and a pattern of a relative input position thereof, which are used frequently by the user, for processing not requiring high security and an authentication identifier and a pattern of a relative input position thereof, which are not usually used, for processing requiring relatively high security, for example.

While the pattern of the relative input position is combined in all the authentication information in the present embodiment, the authentication information may include only the authentication identifier. For example, it may be adapted to register as the authentication information the authentication identifier formed solely of the combination of the identifiers for the processing not requiring high security, and grant authentication when the identifier and the input order thereof correspond with the authentication information regardless of the input position of the identifier. On the other hand, the security can be further enhanced by registering, as the authentication information, the combination of the authentication identifier and the pattern of the relative input position thereof for the processing requiring relatively high security.

<Second Variation>

In addition to an authentication identifier and a pattern of a relative input position thereof, an absolute input position of the authentication identifier may also be used as authentication information.

One aspect is adapted to register in advance whether to use the pattern of the input position of the authentication identifier, which is registered as the authentication information, as the pattern of the relative position or the pattern of the absolute position so that, at the time of the authentication, it is determined whether to grant authentication according to what is registered.

Figure 10:
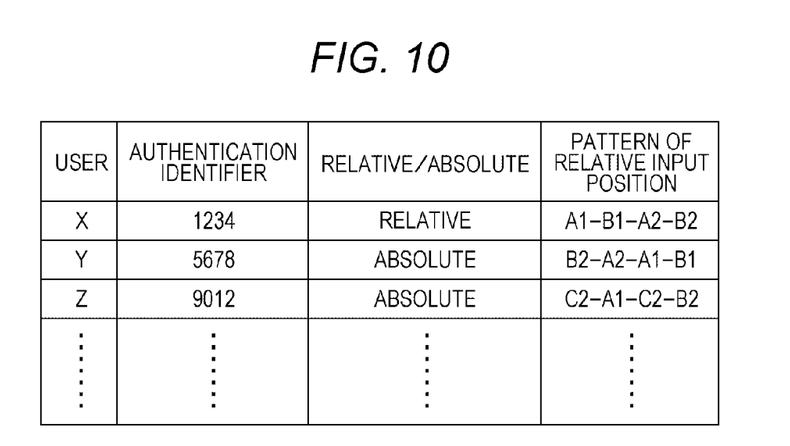
FIG. 10 is a diagram illustrating an example of an authentication information database registered according to second variation of the present invention.

FIG. 10 illustrates an example of an authentication information database registered where an authentication identifier "1234" is registered for a user X, and the pattern of the input position of the identifier is relative. In this case, as with the aforementioned embodiment, the user X gets authenticated when the authentication identifier "1234" is input to an input frame 20 with the pattern of the "relative" input position identical to A1→B1→A2→B2. This means that the authentication is also granted when the identifier "1234" is input to the input frame 20 in the order of A2→B2→A3→B3, B1→C1→B2→C2, and B2→C2→B3→C3. On the other hand, an authentication identifier "5678" is registered for a user Y, and the pattern of the input position of the identifier is absolute. In this case, the user Y gets authenticated only when the authentication identifier "5678" is input to the input frame 20 in the order of B2→A2→A1→B1. This means that the authentication is not granted when the identifier "5678" is input to the input frame 20 in the order of B3→A3→A2→B2 or C2→B2→B1→C1 as the pattern relatively identical to B2→A2→A1→B1. Note that the combination of the authentication identifier and the pattern of the relative input position as well as the corresponding processing to be authenticated are not to be limited to these examples.

The security can therefore be modified by modifying the authentication result depending on whether to determine the input position of the authentication identifier as being relative or absolute. The authentication processing corresponding to the content of the processing can be implemented by registering, as the authentication information, the pattern of the relative input position for processing not requiring high security and the pattern of the absolute input position for processing requiring relatively high security, for example.

<Third Variation>

It may also be adapted to change the processing to be authenticated according to an absolute input position of an authentication identifier in addition to the authentication identifier and a pattern of a relative input position thereof This is a mode combining the first variation and the second variation.

Figure 11:
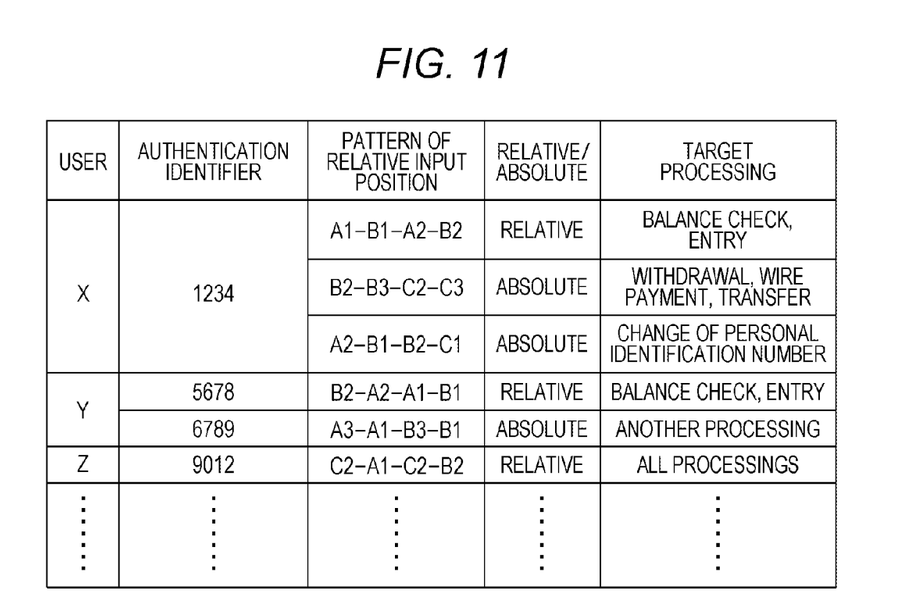
FIG. 11 is a diagram illustrating an example of an authentication information database registered according to third variation of the present invention.

One aspect is adapted to change the processing to be authenticated according to the pattern of the relative and absolute input positions of the authentication identifier that is provided in common In the example of an authentication information database registered in FIG. 11 where an authentication identifier "1234" is registered for a user X, a different pattern of the relative input position of the identifier or a different absolute input position of the identifier corresponds to different processing to be authenticated including "balance check and entry", "withdrawal, wire payment, and transfer", and "change of a personal identification number" pertaining to a bank account of the user X.

In this example, the "balance check" and "entry" to the bank account of the user X are permitted when the authentication identifier "1234" is input to an input frame 20 with the pattern of the relative input position identical to A1→B1→A2→B2. The "withdrawal", "wire payment", and "transfer" from/to the bank account of the user X are permitted only when the authentication identifier "1234" is input to the input frame 20 with the pattern of the absolute input position B2→B3→C2→C3. The "change of a personal identification number" for the bank account of the user X is permitted only when the authentication identifier "1234" is input to the input frame 20 with the pattern of the absolute input position A2→B1→B2→C1. Note that the combination of the authentication identifier and the pattern of the relative input position as well as the corresponding processing to be authenticated are not to be limited to these examples.

The security can therefore be enhanced by providing the different processing to be authenticated according to the pattern of the relative and absolute input positions of the authentication identifier that corresponds to the personal identification number in the related art and is provided in common in the present example. The authentication processing corresponding to the content of the processing can be implemented by registering, as the authentication information, the pattern of the relative input position for processing that does not require high security and the pattern of the absolute input position for processing that requires relatively high security, for example.

There is provided another aspect where the authentication identifier and the pattern of the relative and absolute input positions thereof are both changed according to the processing to be authenticated. As illustrated in the example of the authentication information database registered in FIG. 11, different authentication identifier and pattern of the relative and absolute input positions thereof provided for a user Y correspond to different processing to be authenticated including the "balance check and entry" and "another processing" pertaining to a bank account of the user Y. In this example, the "balance check" and "entry" to the bank account of the user Y are permitted when an authentication identifier "5678" is input to the input frame 20 with the pattern of the relative input position identical to B2→A2→A1→B1. The "another processing" for the bank account of the user Y is permitted when an authentication identifier "6789" is input to the input frame 20 with the pattern of the absolute input position A3→A1→B3→B1. Note that the combination of the authentication identifier and the pattern of the relative input position as well as the corresponding processing to be authenticated are not to be limited to these examples.

The security can therefore be enhanced by providing the different authentication identifier and pattern of the relative and absolute input positions thereof according to the processing to be authenticated. The authentication processing corresponding to the content of the processing can be implemented by registering as the authentication information an authentication identifier and a pattern of a relative input position thereof, which are used frequently by the user, for processing not requiring high security and an authentication identifier and a pattern of an absolute input position thereof, which are not usually used, for processing requiring relatively high security, for example.

Note that a piece of information such as a color, a sound, an image, or a motion may be used as the identifier in any of the aforementioned embodiments and variations. A combination of a plurality of colors including "red", "blue", "green", and "yellow" may be used as the authentication identifier, for example. In this case, it may be adapted to display color choices around the input frame 20 selected, allowing the user to input a color. When using the sound, for example, a combination of a plurality of tones including C, D, E, and F may be used as the authentication identifier. In this case, it may be adapted to display a screen which is used to input the tone (such as piano keys) and allows the user to input the tone, when the input frame 20 is selected. The sound corresponding to the input tone may be output from an output unit 16 in response to the input tone. Alternatively, a sound subjected to pattern recognition may be used as the authentication identifier. In this aspect, a sound or a character recognized by sound recognition is used as the authentication identifier where the sound may be input through a microphone when the input frame 20 is selected. When using the image as the authentication identifier, for example, it may be adapted to display image choices around the input frame 20 selected, allowing the user to select any of the images. Moreover, a still image or moving image subjected to pattern recognition may be used as the authentication identifier. In this aspect, an image recognized by image recognition is used as the authentication identifier where the still image or moving image is captured by a camera and subjected to processing to be treated as the input information, when the input frame 20 is selected. When the motion is used as the authentication identifier, for example, there may be input a trace drawn on a touch panel, a trace calculated as a result of the image recognition by a camera, or a motion measured by a motion sensor such as a terminal device. In addition, there may be used as the authentication identifier a piece of information which is measured by a terminal used and is processed to be identifiable. The authentication identifier may also be formed by any or a combination of the methods.

What is claimed is:

1. A method of authenticating a user to a device, the method comprising:

storing authentication information, the authentication information including a plurality of identifiers, a pattern of a relative input position of the plurality of identifiers within a displayed layout of input frames, and a pattern of an absolute input position of the identifiers within a displayed layout of input frames;

acquiring input information, the input information including identifiers input from a user and an input position of the identifiers within the displayed layout of the input frames;

granting authentication according to a first security level when the identifiers included in the input information correspond with the identifiers in the authentication information, and when a pattern of a relative input position of the identifiers within the displayed layout of the input frames included in the input information corresponds with the pattern of the relative input position of the identifiers in the authentication information;

granting authentication according to a second security level, wherein the second security level is different from the first security level, when the identifiers included in the input information correspond with the identifiers in the authentication information and when a pattern of an absolute input position of the identifiers included in the input information corresponds with the pattern of the absolute input position of the identifiers in the authentication information.

2. The method of claim 1, wherein the authentication information is set by the user.

3. The method of claim 1, wherein the authentication information is set automatically by an authentication device.

4. The method of claim 1, wherein acquiring the input information includes arranging side by side a plurality of input frames to which the identifier input from the user is input, and acquiring as the input position a position of the input frame that is designated when the identifier input from the user is received.

5. The method of claim 1, wherein the identifier includes any or a combination of a number, an alphabetic character, a hiragana character, a katakana character, a kanji character, a color, a sound, an image, a motion, and a piece of measured information that can be processed to be identified.

6. A non-transitory computer-readable device storing an authentication program which causes a computer, including a storage unit configured to store authentication information in which a preset identifier including a plurality of identifiers, a pattern of a relative input position of the plurality of identifiers within a displayed layout of input frames, and a pattern of an absolute input position of the identifiers within a displayed layout of input frames are associated, to perform operations, the operations comprising:

acquiring input information, the input information including identifiers input from a user and an input position of the identifiers within the displayed layout of the input frames;

granting authentication according to a first security level when the identifiers included in the input information correspond with the identifiers in the authentication information, and when a pattern of a relative input position of the identifiers within the displayed layout of the input frames included in the input information corresponds with the pattern of the relative input position of the identifiers in the authentication information;

granting authentication according to a second security level, wherein the second security level is different from the first security level, when the identifiers included in the input information correspond with the identifiers in the authentication information, and when a pattern of an absolute input position of the identifiers included in the input information corresponds with the pattern of the absolute input position of the identifiers in the authentication information.

7. The method of claim 1, wherein, the first security level is relatively low and the second security level is relatively high.

8. The non-transitory computer-readable device of claim 6, wherein, the first security level is relatively low and the second security level is relatively high.

* * * * *